United States Patent [19]

Bates et al.

[11] Patent Number: 5,584,174
[45] Date of Patent: Dec. 17, 1996

[54] POWER TURBINE FLYWHEEL ASSEMBLY FOR A DUAL SHAFT TURBINE ENGINE

[75] Inventors: Bradford Bates, Ann Arbor; Richard C. Belaire, Whitmore Lake; Craig H. Stephan, Ann Arbor, all of Mich.

[73] Assignee: Ford Motor Company, Dearborn, Mich.

[21] Appl. No.: 551,262

[22] Filed: Oct. 31, 1995

[51] Int. Cl.⁶ ............................................. F02C 3/10
[52] U.S. Cl. ..................... 60/39.161; 60/39.75; 415/101
[58] Field of Search ................... 60/39.161, 39.163, 60/39.75; 415/87, 93, 95, 101, 102, 103; 416/184, 199

[56] References Cited

U.S. PATENT DOCUMENTS

| | | |
|---|---|---|
| 2,443,770 | 6/1948 | Kasschau . |
| 3,107,084 | 10/1963 | Conrad et al. ........................ 415/103 |
| 3,771,311 | 11/1973 | Herbst ................... 60/39.281 |
| 3,782,108 | 1/1974 | Holst ...................................... 60/39.36 |
| 4,112,683 | 9/1978 | Bess ......................................... 60/595 |
| 4,157,011 | 6/1979 | Liddle . |
| 4,163,367 | 8/1979 | Yeh . |
| 4,290,268 | 9/1981 | Lowther . |
| 4,336,856 | 6/1982 | Gammell . |
| 4,414,805 | 11/1983 | Walker ................................. 60/39.161 |
| 4,945,811 | 8/1990 | Grieb ..................................... 60/39.75 |

Primary Examiner—Louis J. Casaregola
Attorney, Agent, or Firm—Damian Porcari

[57] ABSTRACT

A power turbine/flywheel assembly for use in a dual shaft turbine engine having a compressor and a gasifier coupled to a first shaft. The assembly includes a second shaft that is uncoupled from the first shaft and is allowed to rotate independently of the first shaft. First and second power turbine blades are attached concentrically about and are directly coupled to the second shaft. A flywheel is directly attached concentrically about the second shaft. The flywheel is positioned between the first and second turbine blades. The first and second power turbine blades and the flywheel rotate as a unit about the second shaft.

10 Claims, 2 Drawing Sheets

POWER TURBINE FLYWHEEL ASSEMBLY FOR A DUAL SHAFT TURBINE ENGINE

RELATED APPLICATIONS

This application is related to application Ser. No. 08/551,261 titled: HYBRID ELECTRIC PROPULSION SYSTEM USING A DUEL SHAFT TURBINE ENGINE, naming Bates, Belaire and Stephan as inventors, filed on the same date as the present application, and incorporated herein by reference.

BACKGROUND OF THE INVENTION

1. Field of the Invention

The present invention relates to a power turbine for a turbine engine. More specifically, the present invention relates to the use of a combination power turbine and flywheel assembly for a dual shaft turbine engine.

2. Description of the Related Art

Liquid fueled turbine engines have been used to power vehicles because of their operating efficiency and durability. They are especially useful when used at a constant speed and under a constant vehicle load. Operating a turbine engine at a constant speed and load greatly extends the durability of the engine and optimizes its fuel efficiency. Turbine engines may be directly coupled to the vehicle drive wheels to provide a mechanical drive or, alternatively, they maybe used to operate a generator to provide electric drive.

It is known to use a turbine engine to directly power the drive wheels of a vehicle as illustrated in U.S. Pat. No. 4,157,011, issued Jun. 5, 1979, to Liddle. The Liddle patent teaches the use of a single shaft turbine engine mechanically coupled through a continuously variable transmission to the vehicle drive wheels. The engine is used in an intermittent fashion and requires repeated restarts. A flywheel located between the turbine and the transmission provides a rotational inertia that is sufficient to start turbine engine. An optional clutch allows the turbine engine to be switched on and off. The vehicle may be manually driven for a short period of time on the inertia of the flywheel once the turbine engine is shut down. The primary disadvantages of this system are the limitations of continuously variable transmissions to transmit mechanical energy. Heavy vehicle load requirements, such as the torque needed to power the vehicle up hills or over obstacles, are transmitted through the transmission and to the turbine engine. This creates a load or drag on the engine and thereby reduces the engine's operating efficiency. Additionally, frictional forces within the continuously variable transmission significantly reduce the operating efficiency of the propulsion system. These and other disadvantages of mechanically coupling the engine to the drive wheels has led others to indirectly couple the turbine engine to the vehicle wheels.

To maintain the efficiency of a turbine engine, it has been used to power a generator. The generator in turn powers a vehicle traction motor that operates the drive wheels. A system that used this approach is illustrated in U.S. Pat. No. 4,336,856, issued Jun. 29, 1982, to Gamell. Like the Liddle patent, the Gainell patent teaches a single shaft turbine engine directly coupled to a generator/motor. The generator/motor in turn provides electrical current to power a vehicle traction motor. The motor drives the vehicle wheels. An optional clutch between the turbine engine and generator/motor permits the turbine to rotate freely when the vehicle is stopped. By releasing the clutch, the vehicle can be started up slowly.

A flywheel attached adjacent the drag turbine provides additional rotational inertia to the turbine engine. Single shaft turbine engines, as the type used in Gamell, suffer from the problem of transmitting vehicle drag to the turbine engine when the vehicle is under a significant load. This drag causes an increased torque on the turbine engine, thereby reducing the engine operating efficiency.

The flywheel taught by Gamell exposes the rotating flywheel to ambient air. The air drag on the rotating flywheel reduces the flywheel efficiency and thus, the overall efficiency of the vehicle. Others have used flywheels contained within a vacuum enclosure to reduce the air drag on the flywheel. These systems have required gearing to match the flywheel rotational speed to that of the engine.

It is desirable to provide a power turbine flywheel assembly that has a reduced air drag on the flywheel without the need of a vacuum enclosure. It is a further desire of the present invention to provide a flywheel assembly for a dual shaft turbine engine that is compact and easy to manufacture. It is yet another desire of the present invention to reduce the number of bearings needed to support a power turbine and flywheel. These and other advantages and features of the present invention would be more fully described below and in the accompanying drawings.

SUMMARY OF THE INVENTION

The present invention provides a power turbine/flywheel assembly for use in a dual shaft turbine engine having a compressor and a gasifier coupled to a first shaft. The assembly includes a second shaft that is uncoupled from the first shaft and is allowed to rotate independently of the first shaft. First and second power turbine blades are attached concentrically about and are directly coupled to the second shaft. A flywheel is directly attached concentrically about the second shaft. The flywheel is positioned between the first and second turbine blades. The first and second turbine blades and the flywheel rotate as a unit about the second shaft.

The invention is particularly useful as part of a dual shaft turbine engine for use in a hybrid electric vehicle. When used as part of a hybrid electric vehicle, a compressor and a gasifier are directly coupled to a first shaft of the engine. A generator is coupled to the second shaft to provide electric current to the electric drive motor. The first and second drive shafts are uncoupled and are allowed to spin independently of one another. Exhaust gases from the gasifier turn the power turbine; thus the turning power turbine turns the generator and flywheel as a unit.

These are other objects and advantages of the present invention will become more apparent to those skilled in the art from the following description and reference to the attached drawings.

DETAILED DESCRIPTION OF THE PREFERRED EMBODIMENTS

Figure 1:
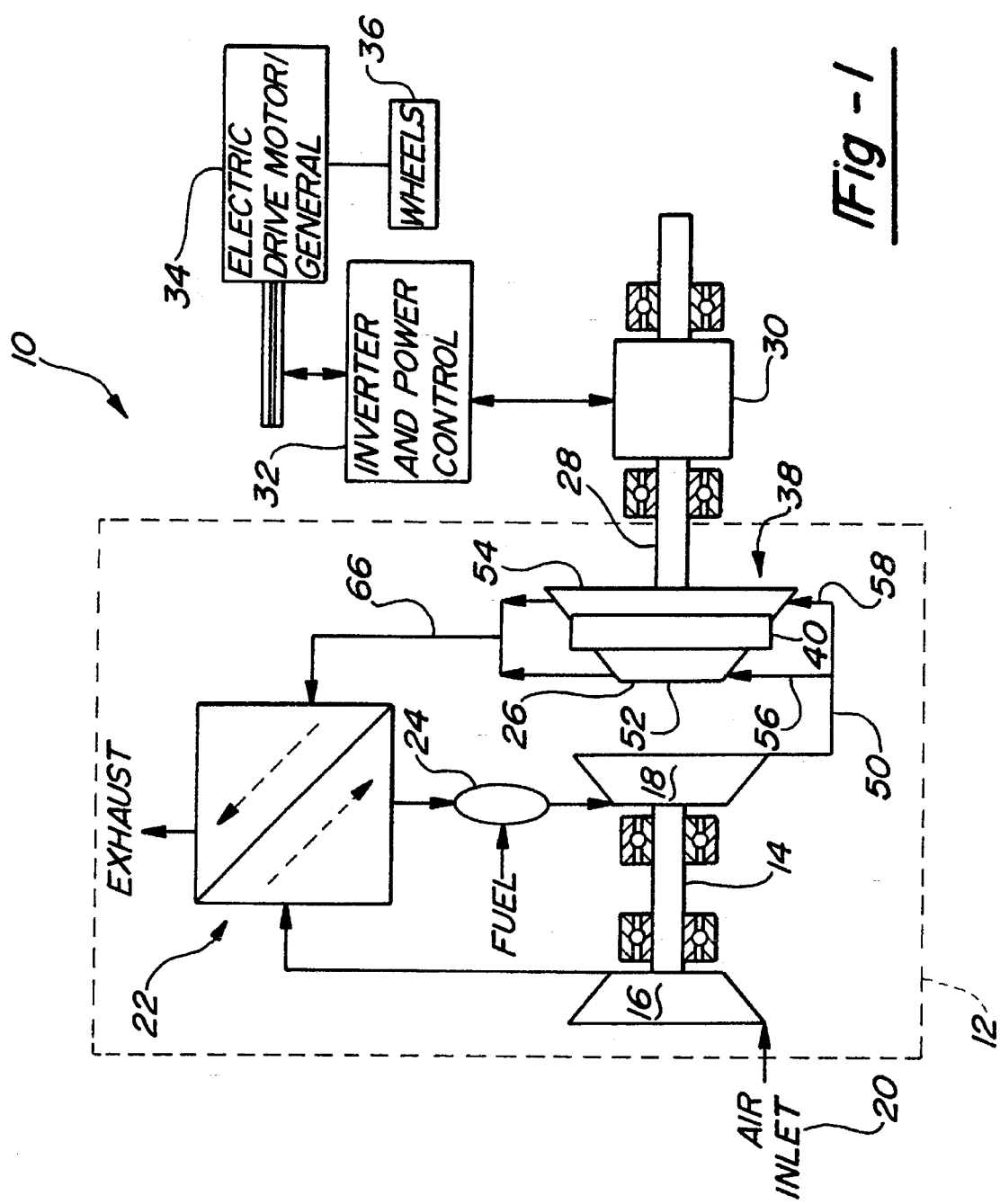
FIG. 1 is a diagrammatic view of a hybrid electric propulsion system using a the present invention.

A schematic representation of the present invention is illustrated in FIG. 1. The hybrid electric vehicle propulsion system 10 includes a twin shaft turbine engine 12. The engine 12 includes a first shaft 14, a compressor turbine 16 and a gasifier turbine 18. The compressor turbine 16 receives ambient air from an air inlet 20. The compressed air passes through a heat exchanger 22. Fuel is added to the compressed air by a combuster 24. The air/fuel mixture coming from combuster 24 is ignited and directed to the gasifier turbine 18. The combustion byproducts from gasifier turbine 18 greatly expand in the form of high velocity exhaust gases. These gasses are directed from gasifier turbine 18 to a power turbine 26. The power turbine 26 is connected to a second shaft 28. The first shaft 18 and the second shaft 28 together form the dual shaft turbine engine 12. The exhaust gases cause power turbine 26 and the second shaft 28 to spin rapidly. Exhaust gases passing through power turbine 26 are directed to the heat exchanger 22 and exhausted.

The rotary output of engine 12 is directly coupled through the second shaft 28 to a generator/motor 30. The generator/motor 30 is designed to operate at the engine speeds of turbine engine 12. The rotation of the second shaft 28 causes the rotor (not shown) within the generator/motor 30 to turn and thereby create an AC electric current. Generator/motor 30 is designed to provide most of the electric current needed to drive a hybrid electric vehicle.

As will be more fully described below, the generator/motor 30 is also operable as a motor so as to receive electric current and rotate a flywheel. The generator/motor 30 is connected to an inverter/power controller 32. Inverter/power controller 32 converts the AC electric current coming from the generator/motor 30 into DC electric current. Many electric vehicles use DC current to operate DC drive motors or as an interim before being reconverted to AC to operate an AC drive motor. Inverter/power controller 32 also limits the amount of current that passes to or from generator/motor 30 to prevent the electric current from exceeding the capacities of the motor/generator 30.

The inverter/power controller 32 provides electric current to electric drive motor/generator 34. The electric drive motor/generator 34 is directly coupled to the vehicle wheels 36 and provides the tractive force necessary to propel the vehicle. The drive motor/generator 34 may be either AC or DC. If drive motor 34 is AC, an additional inverter (not shown) is necessary to receive the DC current from inverter/power controller 32. The electric drive motor 34 is preferably also operable as a generator to provided regenerative breaking for the vehicle. When drive motor/generator 34 is operating as a generator, rotational energy from the vehicle drive wheels 36 causes the drive motor/generator 34 to create an AC current and slow the vehicle. The regenerative electric current passes through the inverter/power controller 32 to the generator/motor 30. The generator/motor 30 is caused to operate as a motor and rotates the second shaft 28. Electric current from drive motor/generator 34 is stored as rotational energy in a flywheel 40. The inverter/power controller 32 coordinates the operation of the drive motor/generator 34 and the generator/motor 30.

A flywheel/power turbine assembly 38 is directly coupled to the second shaft 28 by means of a magnetic coupling 42. Flywheel/power turbine assembly 38 includes a flywheel 40 between two halves of the power turbine 26. Exhaust gases from the gasifier turbine 18 are diverted into two flow paths by a Y-shaped diverter 50. The exhaust gases spin two turbine blades 52, 54. The flywheel 40 is attached between blades 52, 54 to the second shaft 28. The turbine blades 52, 54 and flywheel 40 spin as a unit. The exhaust gases passing through power turbine 26 combine in a Y-shaped diverter 66 to form one combined flow path that leads into the heat exchanger 22.

Figure 2:
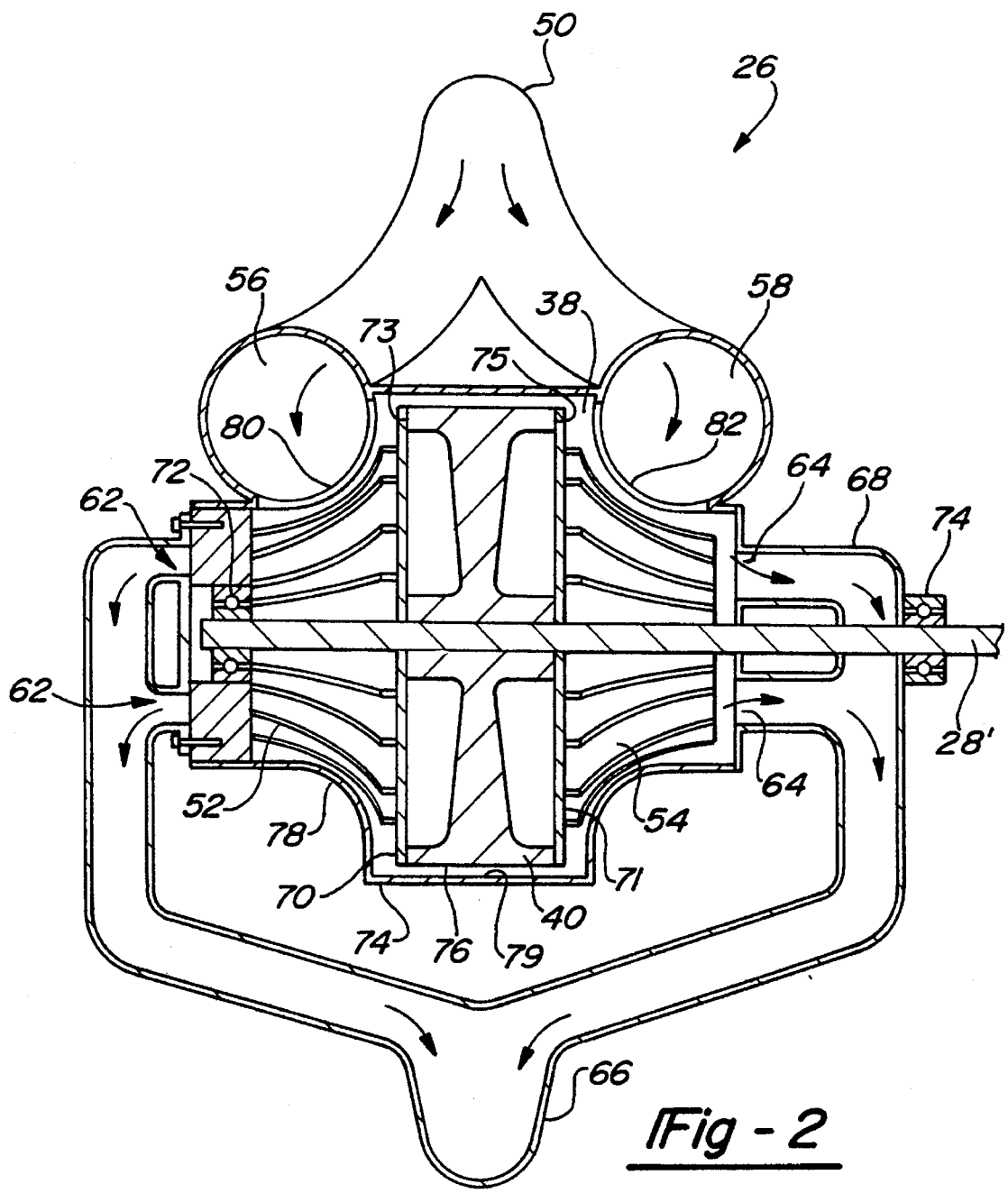
FIG. 2 is a cross-sectional view of the power turbine/flywheel illustrated in FIG. 1.

Illustrated in FIG. 2 is a cross-sectional view of the power turbine/flywheel assembly 38. Exhaust gases entering through the diverter 50 are directed into flow paths 56, 58. The flow paths 56, 58 receive an approximately equal amount of exhaust gas from the diverter 50. Gases from flow path 56 enter turbine blade 52 radially at the largest diameter of the turbine blade 52. The entering exhaust gases are at a high pressure and temperature. The exhaust gases expand in turbine blade 52 and exit axially through a flow path outlet 62. The gases exiting the power turbine/flywheel assembly 38 are reduced in pressure and temperature. The expanding exhaust gases from flow path 56 rapidly rotate the turbine blade 52. Exhaust gases passing through flow path 58 rotate the turbine blade 54 and axially exit power turbine/flywheel assembly 38 through a flow path outlet 64. The expanded exhaust gases from the outlets 62, 64 are combined in diverter 66 into one flow path. Exhaust gases passing through outlets 62, 64 are combined in diverter 66 and are directed to heat exchanger 22 (not shown in this view). The outlet 64 allows the second shaft 28 to pass through a manifold 68.

Positioned between turbine blades 52, 54 is the flywheel 40. The turbine blades 52,54 and flywheel 40 are all directly attached to the second shaft 28 and rotate as a unit. End plates 70, 71 serve to support turbine blades 52, 54 and close the ends of the turbine volutes to the flow of exhaust gases. End plates 70, 71 secure turbine blades 52, 54 to the axial surfaces 73, 75 of flywheel 40 as shown. Bearings 72, 74 serve to support the power turbine/flywheel assembly 38 about the second shaft 28.

The aerodynamic drag experienced by the flywheel 40 is believed to be less than that experienced by a flywheel in ambient air. The flywheel-to-air contact occurs along a radial surface 76. The axial surfaces 73, 75 of the flywheel 40 are covered by the plates 70, 71 and are free of aerodynamic drag. The turbine blades 52, 54 and the flywheel 40 are contained in a housing 78. Housing 78 has an interior radial portion 79 that closely conforms to the flywheel radial surface 76. The space between radial surface 76 and the interior portion 79 is relatively small in the order of 1 centimeter or less and is chosen to minimize aerodynamic losses. Housing 78 includes apertures 80, 82 that receive exhaust gases from flow paths 56, 58. Exhaust gases entering apertures 80, 82 flow over the radial surface 76. The radial surface 76 may optionally include ribs or dimples (not shown) or another surface texture to minimize the aerodynamic drag between the exhaust gas and the radial surface 76. The amount of air drag is believed to be minimal because the exhaust gas and the radial surface 76 are both moving in the same direction and at approximately the same speed.

Method of Operation

The turbine engine 12 in FIG. 1 is started by a conventional starter (not shown). Because the first shaft 14 rotates independently of the second shaft 28, the engine 12 may be started easily with a relatively small starter. Only the compressor turbine 16 and the gasifier turbine 18 need to rotate to start the engine 12. After the engine 12 is started, exhaust gases from the gasifier turbine 18 are directed to the power turbine 26 and begin to spin up the second shaft 28 to normal operating speeds. The generator/motor 30 is mounted concentricity about the second shaft 28 and rotates with the power turbine 26. The rotating generator/motor 30 creates an AC electric current that is directed to the inverter/power controller 32. The mass of the generator/motor 30 and of flywheel 40 may cause the second shaft 28 to rotate at a slower speed than the first shaft 14 if the size and shape of the gasifier turbine 18 and the power turbine 26 are comparable. This difference in rotating speed is allowed without compromising efficiency because the first and second shafts 14, 28 are uncoupled.

Electric current from generator/motor 30 is provided to inverter/power controller 32 and then to the electric drive motor/generator 34. The drive motor/generator 34 powers wheels 36 and provides motion for the vehicle. When the vehicle undergoes a high load condition such as a passing maneuver or climbing a hill, the additional load required by the drive motor/generator 34 draws a higher current from inverter/power controller 32. This increased load causes an increased torque demand on the generator/motor 30. The additional torque needed to overcome the temporary load demanded by drive motor/generator 34 is provided from the rotational energy within flywheel 40. As energy is drawn from flywheel 40 by generator/motor 30, the speed of the second shaft 28 drops. When the temporary high load condition is relieved, the excess power produced by engine 12 is again directed to the increasing the speed of the flywheel 40.

When the vehicle is operated in a regenerative braking mode, electric current from the drive motor/generator 34 passes through the inverter/power controller 32 and causes the generator/motor 30 to act as a motor. The generator/motor 30 causes the second shaft 28 and the flywheel 40 to spin faster and stores the excess electric current produced by the regenerative braking condition as rotational kinetic energy within flywheel 40. This excess rotational kinetic energy may be returned to the vehicle in a form of AC electric current through generator/motor 30 operating as a generator.

The vehicle may be operated for short periods of time merely by the rotational kinetic energy stored within flywheel 40. Flywheel 40 rotates second shaft 28 and causes the generator/motor 30 to produce and AC electric current. The power turbine 26 also rotates together with second shaft 28. However, first shaft 14, the gasifier and compressor turbines 18, 16 are not rotated.

While the embodiment illustrated in FIG. 1 and 2 may not be as efficient as a flywheel totally enclosed in a vacuum chamber, the present invention reduces the cost and complexity of the overall system by eliminating the need for the vacuum enclosure and magnetic couplings.

The invention has been illustrated by its preferred embodiments, other embodiments of the present invention are also possible and are intended to be covered within the spirit and scope of the attached claims.

What is claimed:

1. A power turbine/flywheel assembly for a dual shaft turbine engine having a compressor and a gasifier coupled to a first shaft, said assembly comprising:

a second shaft uncoupled from said first shaft;

first and second power turbine blades attached concentrically about and directly coupled to said second shaft; and a flywheel attached concentrically about and directly coupled to said second shall, said flywheel being positioned between said first and second turbine blades, whereby said first and second power turbine blades and said flywheel rotate as a unit about said second shaft.

2. The power turbine/flywheel assembly of claim 1, and further comprising a first Y-shaped diverter receiving exhaust gases from said gasifier, said first diverter having first and second flow paths directing said exhaust gases to each of said first and second turbine blades, said exhaust gases causing said first and second turbine blades to rotate.

3. The power turbine/flywheel assembly of claim 1, and further comprising a second Y-shaped diverter, said second diverter having first and second flow paths receiving said exhaust gases from said first and second turbine blades and combining said exhaust gases into a combined flow path.

4. The power turbine/flywheel assembly of claim 1, and further comprising a housing receiving said first and second turbine blades, said second shaft and said flywheel, said housing having two or more apertures receiving exhaust gases from said first and second flow paths of said first diverter.

5. The power turbine/flywheel assembly of claim 4, and further comprising a manifold attached to said second flow path of said second diverter.

6. The power turbine/flywheel assembly of claim 4, wherein said flywheel has a radial surface and said housing has in interior radial portion closely conforming to said flywheel radial surface.

7. The power turbine/flywheel assembly of claim 6, wherein the distance between said flywheel radial surface and said housing interior radial portion is approximately 1 centimeter or less.

8. The power turbine/flywheel assembly of claim 1, and further comprising first and second end plates between said flywheel and said first and second turbine blades, said first and second end plates secure said first and second turbine blades to axial surfaces of said flywheel.

9. A power turbine/flywheel assembly for a dual shaft turbine engine having a compressor and a gasifier coupled to a first shaft, said assembly comprising:

a second shaft uncoupled from said first shaft;

first and second power turbine blades attached concentrically about and directly coupled to said second shaft;

a flywheel having a radial surface and an axial surface and attached concentrically about and directly coupled to said second shaft, said flywheel being positioned between said first and second turbine blades, and said first and second power turbine blades and said flywheel rotate as a unit about said second shaft;

a first Y-shaped diverter receiving exhaust gases from said gasifier and having first and second flow paths directing said exhaust gases to each of said first and second turbine blades, said exhaust gases causing said first and second turbine blades to rotate;

a second Y-shaped diverter having first and second flow paths receiving said exhaust gases from said first and second turbine blades and combining said exhaust gases into a combined flow path; and a housing receiving said first and second turbine blades, said second shaft and said flywheel, said housing having two or more apertures receiving exhaust gases from said first and second flow paths of said first diverter, and said housing has in interior radial portion closely conforming to said flywheel radial surface.

10. A liquid fueled dual shaft turbine engine comprising:

a compressor;

a gasifier;

a first shaft coupled to said compressor and gasifier;

a second shaft uncoupled from said first shaft;

first and second power turbine blades attached concentrically about and directly coupled to said second shaft;

a flywheel having a radial surface and an axial surface and attached concentrically about and directly coupled to said second shaft, said flywheel being positioned between said first and second turbine blades, and said first and second power turbine blades and said flywheel rotate as a unit about said second shaft;

a first Y-shaped diverter receiving exhaust gases from said gasifier and having first and second flow paths directing said exhaust gases to each of said first and second turbine blades, said exhaust gases causing said first and second turbine blades to rotate;

a second Y-shaped diverter having first and second flow paths receiving said exhaust gases from said first and second turbine blades and combining said exhaust gases into a combined flow path; and a housing receiving said first and second turbine blades, said second shaft and said flywheel, said housing having two or more apertures receiving exhaust gases from said first and second flow paths of said first diverter, and said housing has in interior radial portion closely conforming to said flywheel radial surface.

* * * * *

UNITED STATES PATENT AND TRADEMARK OFFICE
CERTIFICATE OF CORRECTION

PATENT NO : 5,584,174

DATED : December 17, 1996

INVENTOR(S): Bates, Stephan, Belaire

It is certified that error appears in the above-identified patent and that said Letters Patent is hereby corrected as shown below:

Column 1. After the title Insert the following :

This invention was made with Government support under NREL Subcontract No. ZCB-4-13032-02 Prime Contract No. DE-AC36-83CH10093 awarded by the Department of Energy. The Government has certain rights in this invention.

Signed and Sealed this

Fourth Day of May, 1999

*Attest:*

Q. TODD DICKINSON

*Attesting Officer*  Acting Commissioner of Patents and Trademarks